United States Patent [19]

Johnson et al.

[11] Patent Number: 4,627,050
[45] Date of Patent: Dec. 2, 1986

[54] TIME DIVISION MULTIPLEXED COMPUTERIZED BRANCH EXCHANGE

[75] Inventors: Howard W. Johnson, Santa Clara; Michael G. Duncan, Fremont; Rod G. Sinks, Mountain View; John D. Edwards, Campbell; Martin H. Graham, Berkeley; James M. Kasson, Menlo Park; Charles M. Corbalis, San Jose, all of Calif.

[73] Assignee: Rolm Corporation, Santa Clara, Calif.

[21] Appl. No.: 613,026

[22] Filed: May 22, 1984

[51] Int. Cl.⁴ .................... H04J 3/02; H04J 3/16
[52] U.S. Cl. ............................. 370/85; 370/89; 370/67
[58] Field of Search ............... 370/85, 67, 88, 89, 370/94

[56] References Cited

U.S. PATENT DOCUMENTS

| | | | |
|---|---|---|---|
| 2,723,309 | 11/1955 | Lair et al. | 370/85 |
| 3,732,374 | 5/1973 | Rocher et al. | 370/89 |
| 3,851,104 | 11/1974 | Willard et al. | 370/85 |
| 4,161,786 | 7/1979 | Hopkins et al. | 370/94 |
| 4,210,780 | 7/1980 | Hopkins et al. | 370/85 |

Primary Examiner—Douglas W. Olms
Assistant Examiner—Wellington Chin
Attorney, Agent, or Firm—Blakely, Sokoloff, Taylor & Zafman

[57] ABSTRACT

An improved architecture for a computerized branch exchange particularly for a time division multiplexed bus used in the exchange. An intershelf bus includes a unidirectional source bus which receives signals from expanders and a unidirectional destination bus which transmits signals to the expanders. The expanders, through another bus, communicate with line cards which interface with telephone station sets, commercial lines, etc. A time division multiplexed controller updates distributed connection tables contained in each of the expanders and controls the flow of data onto and from the unidirectional buses. The distributed connection tables eliminate the need to broadcast addresses during each time slot. The arrangement is particularly useful in reducing blocking associated with prior art bidirectional buses.

16 Claims, 11 Drawing Figures

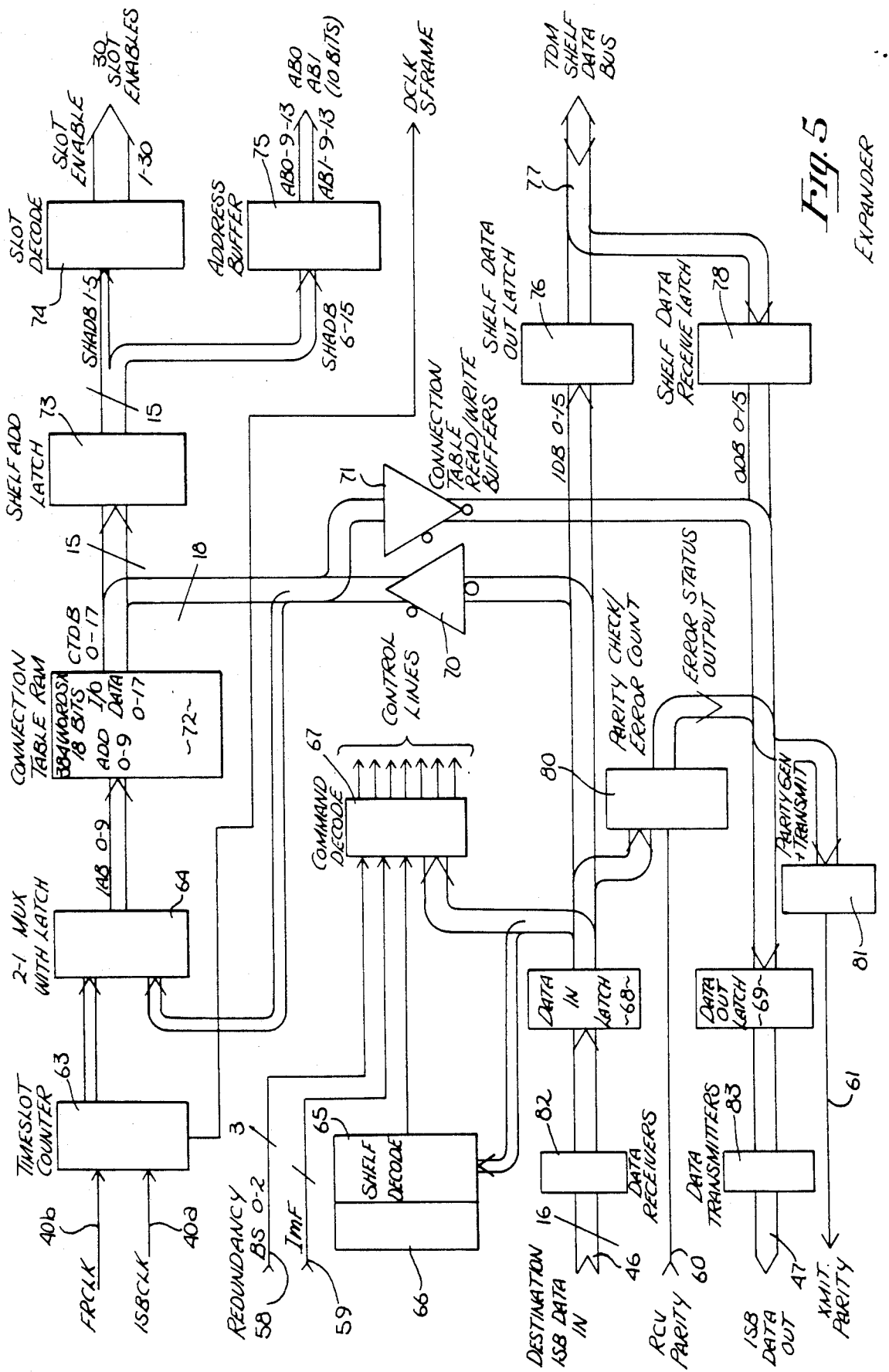
Fig. 5 EXPANDER

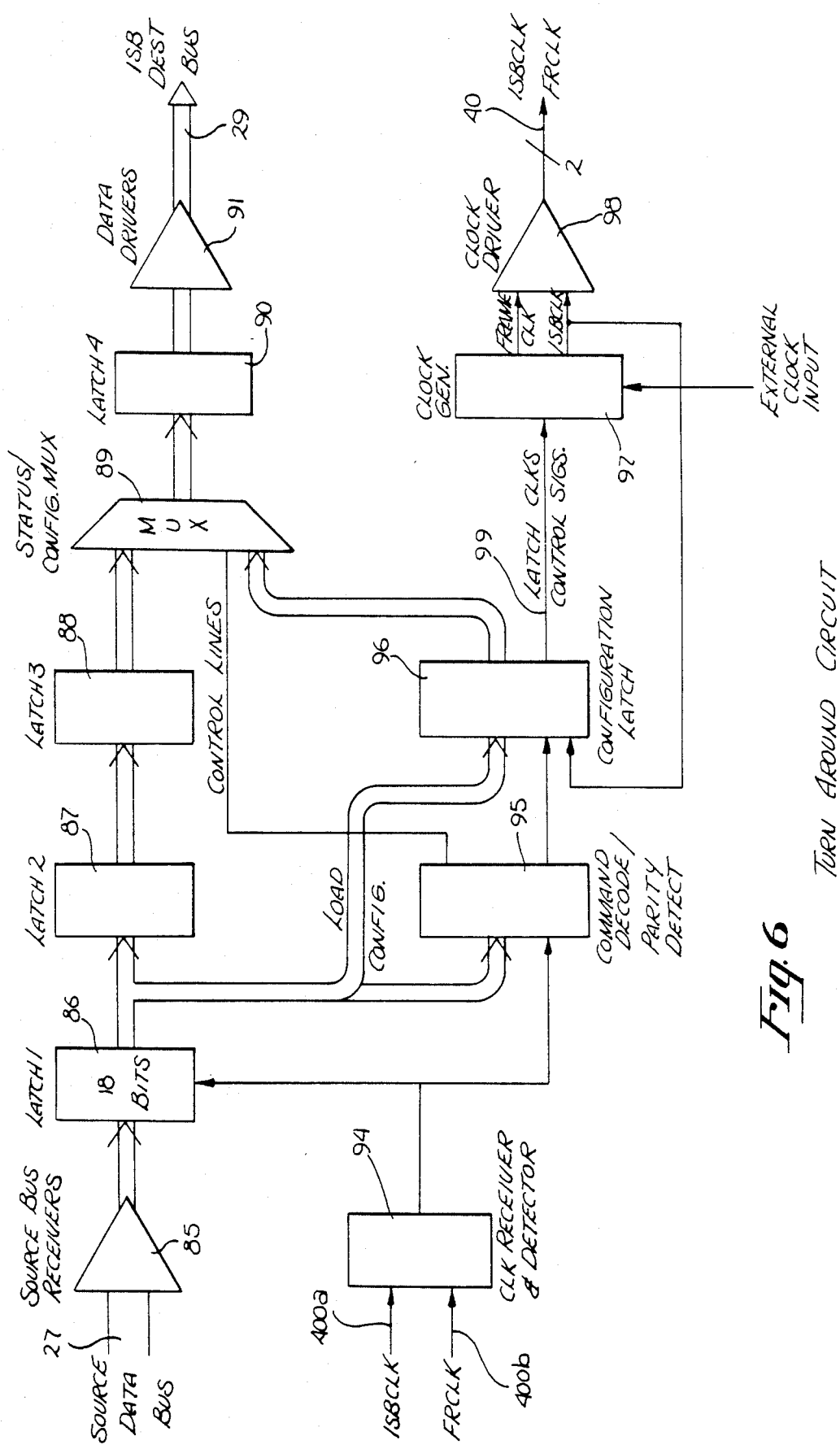
Fig. 6  Turn Around Circuit

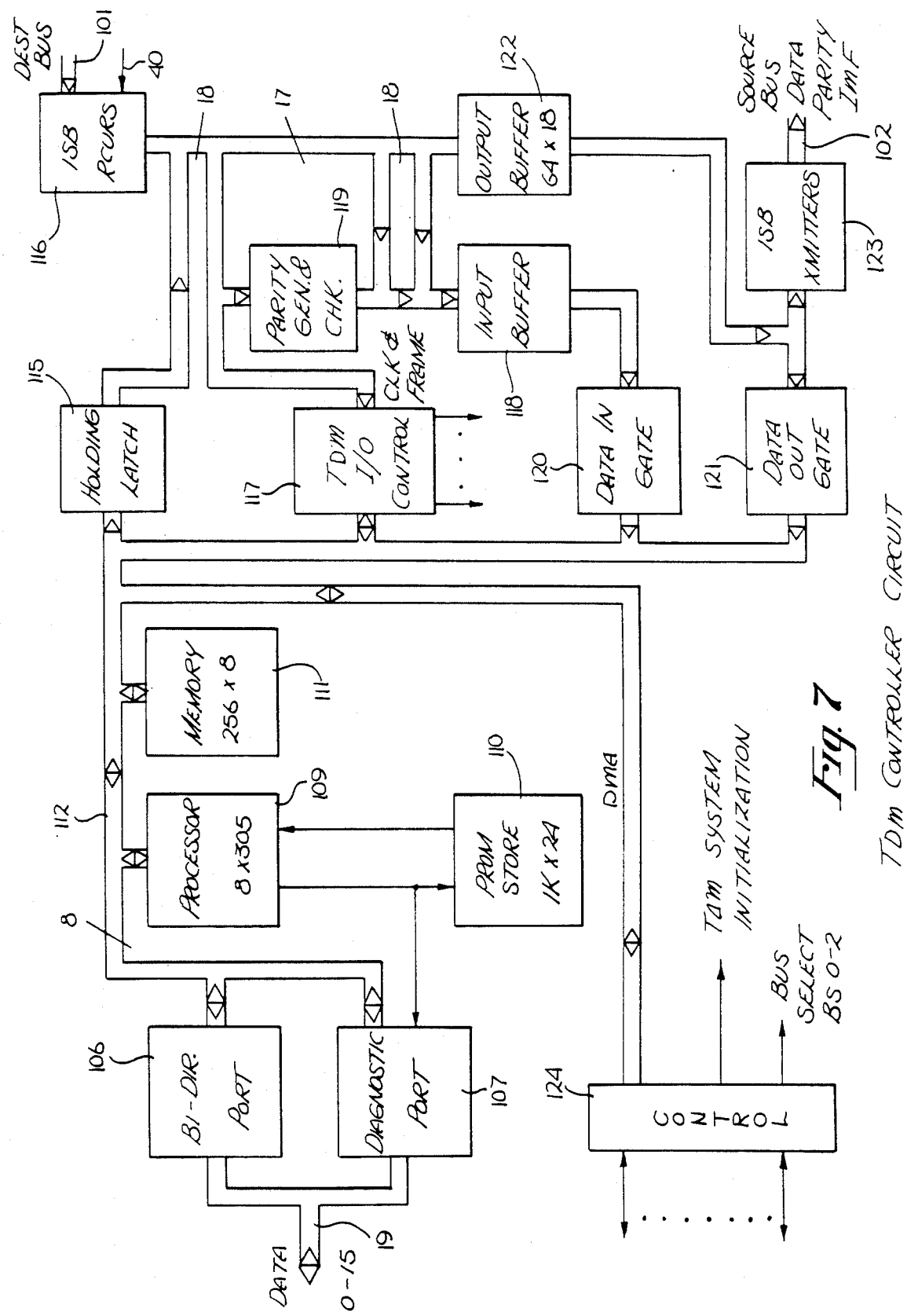
Fig. 7  TDM Controller Circuit

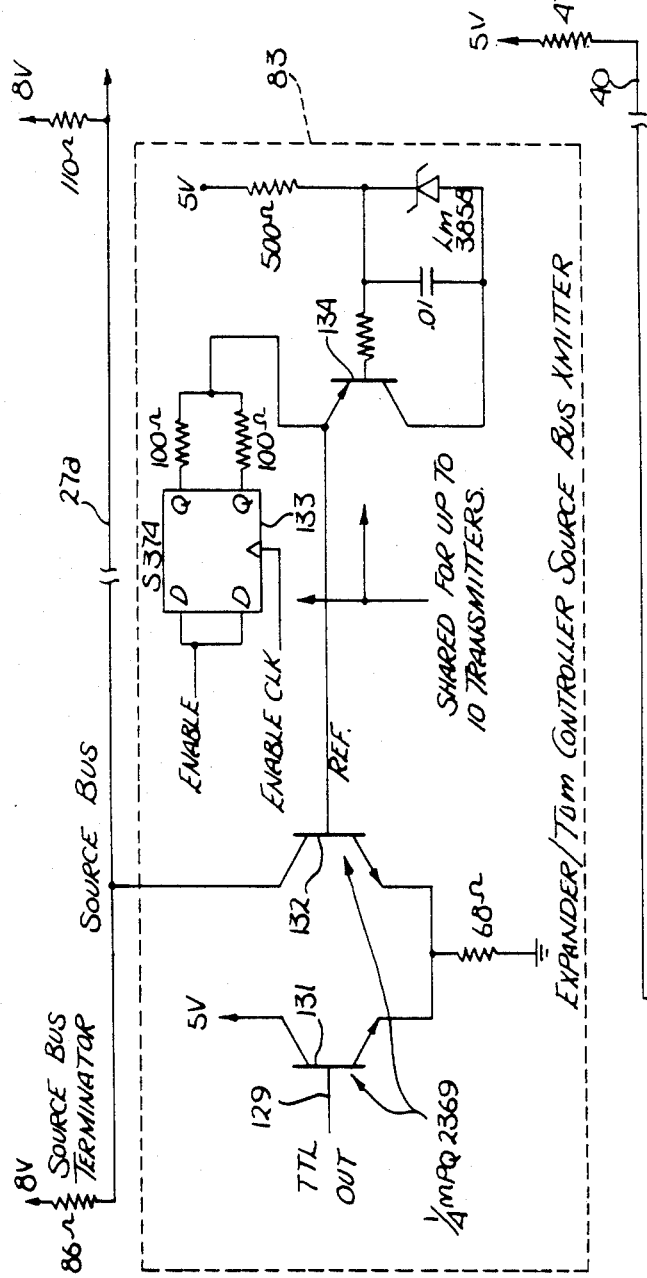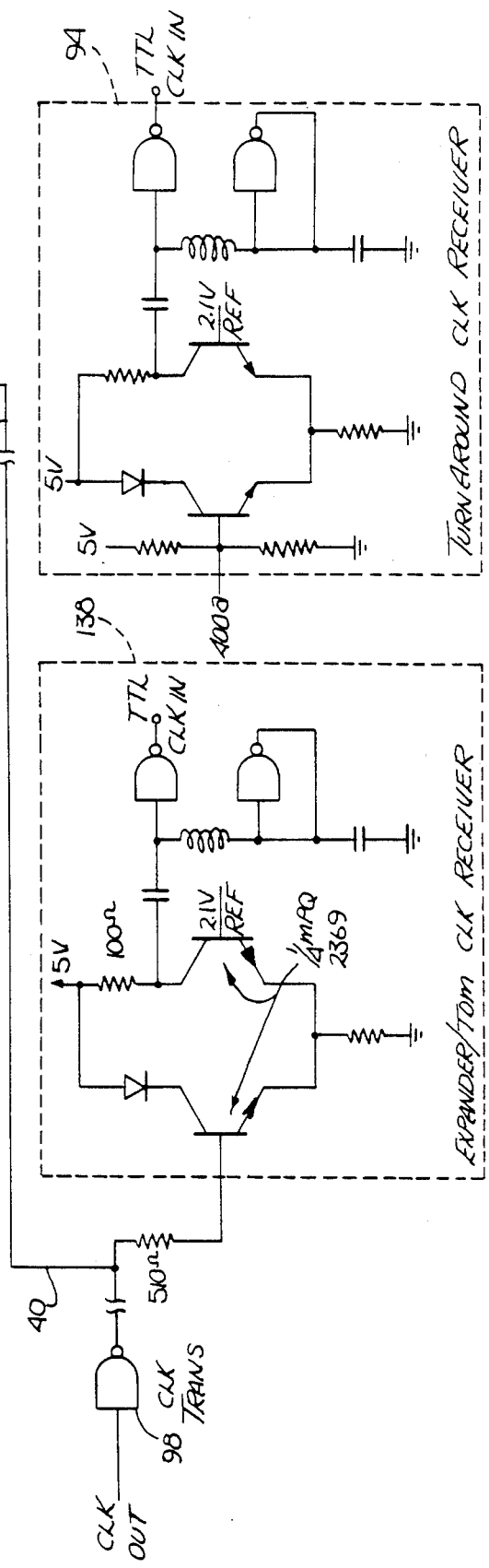
Fig. 8a

TIME DIVISION MULTIPLEXED COMPUTERIZED BRANCH EXCHANGE

BACKGROUND OF THE INVENTION

1. Field of the Invention

The invention relates to the field of time division multiplexed switching, particularly in a computerized branch exchange.

2. Prior Art

There are many commercially available computerized branch exchanges used for the switching of voice signals, and in some cases, also data signals. Most often, the voice signals are digitized and switched over a common time division multiplexed (TDM) bus. A serial bit stream is, for instance, transferred between two lines over the bus in a particular time slot. In another commercially available computerized branch exchange, the data bits are transferred in parallel on a directional bus between lines.

There are both practical and theoretical limitations to the available bandwidth attainable for a given bus, and consequently, there are limitations on the number of calls or other exchanges that can be made over the bus. The present invention deals with the expansion of this bandwidth in a branch exchange bus. Set forth later in this application (in conjunction with FIG. 1) there is a discussion of a prior art computerized branch exchange which is commercially available from ROLM Corporation. The problems associated with the expansion of bandwidth for the architecture of that exchange is disclosed.

SUMMARY OF THE INVENTION

Improved architecture, particularly for a time division multiplexed bus in a computerized branch exchange is described. In the presently preferred embodiment, the branch exchange includes a main bus (intershelf bus) and a plurality of "shelf" buses. A plurality of circuits referred to as expanders, are used to couple the intershelf bus with the shelf buses. Line cards which interface with telephone station sets, commercial lines, etc., are connected to these shelf buses.

With the present invention, the intershelf bus comprises a unidirectional source bus which receives signals from the expanders and a unidirectional destination bus which transmits signals to the expanders. The source bus provides signals to the destination bus through a turn-around circuit. The computer used to control the exchange communicates with the source bus and destination bus through a circuit referred to as the TDM controller circuit. This computer, through the TDM controller circuit and source and destination bus, senses conditions such as off-hook, the called number, etc., and then distributes information on connections to connection tables which are part of the expanders. This distributed connection table arrangement eliminates the need to broadcast addresses during each time slot.

The turnaround circuit provides time delay which is a function of intershelf bus length. It also provides coupling to other exchanges (nodes).

A clocking signal is distributed along the destination bus to provide sequential activation of the expanders both for transmission and reception. In this manner, the propagation time through the source bus and destination bus can be longer than the bus cycle period without causing interference on these buses.

Other improvements in the described computerized branch exchange will become apparent from the detailed description.

BRIEF DESCRIPTION OF THE DRAWINGS

FIG. 5 is a block diagram of an expander circuit used with the present invention.

FIG. 6 is a block diagram of a turnaround circuit used in the present invention.

FIG. 7 is a block diagram of the time division multiplexed (TDM) controller circuit used in the present invention.

FIGS. 8a and 8b contain electrical schematics of the terminators and driving circuits used for driving the intershelf bus and the driving circuit used for the clocking signal distributed with the bus.

DETAILED DESCRIPTION OF THE INVENTION

Improved architecture for a computerized branch exchange which reduces blocking and other problems associated with time division multiplexed switching is described. In the following description, numerous specific details are set forth such as specific clocking frequencies, etc., in order to provide a thorough understanding of the present invention. It will be obvious, however, to one skilled in the art that the present invention may be practiced without these specific details. In other instances, well-known circuits have been shown in block diagram form only in order not to unnecessarily obscure the present invention.

The present invention is discussed in conjunction with a computerized branch exchange manufactured and sold by ROLM Corporation of Santa Clara, Calif. It will be apparent to one skilled in the art that the present invention has application to other switching systems. Also, for purposes of discussion, the following description mainly deals with the switching of voice signals; it will be apparent that other signals may be switched such as data, as is currently done.

PRIOR ART COMPUTERIZED BRANCH EXCHANGE

Figure 1:
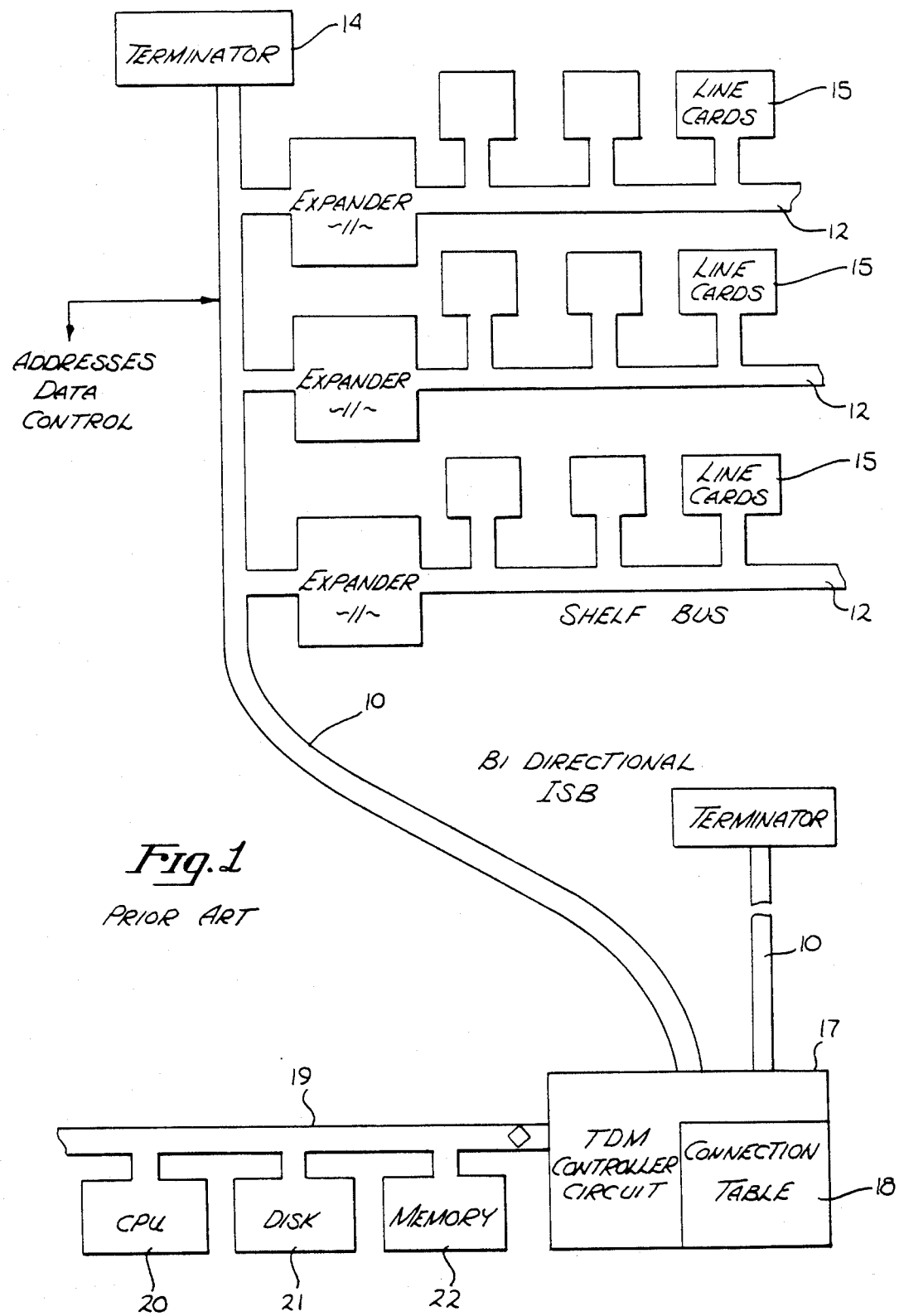
FIG. 1 is a block diagram illustrating a prior art computerized branch exchange.

In the prior art exchange of FIG. 1, a bidirectional bus 10 interconnects a plurality of expanders 11 and also provides coupling to a time division multiplexed (TDM) controller circuit 17. In practice, the bus 10 is a long, flat, multi-conductor, flexible cable which interconnects the expanders which are located on shelves in a cabinet and the TDM controller circuit 17. Thus, the bus 10 is sometimes referred to as the intershelf bus (ISB). On each shelf, an expander 11 buffers the signals from the bus 10 and couples the signals to a shelf bus 12.

This bus, in practice, is a "back plane" arrangement where the conductive paths are formed on a printed circuit board. A plurality of cards, such as the line cards 15, plug into the shelf bus 12. These cards provide the interface to the telephone station sets and commercial lines, and consequently, receive the twisted pairs or other lines used for coupling to the station sets, commercial lines, or the like. The cards 15, as is well-known, detect off-hook conditions, sense signalling information (e.g., number being called), and perform other well-known functions.

In the exchange of FIG. 1, address, data and control signals are time multiplexed on the bus 10 and on the buses 12. This multiplexing occurs under the control of a central processing unit (CPU) 20. The CPU 20, disk drive 21, and memory 22, are coupled to a common bidirectional computer bus 19 which interfaces with the bus 10 through the TDM controller circuit 17. The TDM controller circuit 17 includes a connection table 18 which is a random-access memory. The table 18 stores in the "to" and "from" addresses for each call being completed over the bus 10. That is, when a call is initiated the called and calling numbers are sensed through the bus 10 and stored in appropriate locations in table 18. This table is scanned in each time frame to provide address signals which, after transmission onto the shelf buses, access the line cards.

Fourteen lines of the bus 10 carry the "to" addresses, fourteen lines carry the "from" addresses, sixteen lines carry the data and miscellaneous control signals are handled over other lines of the bus 10. Four of the fourteen "to" address lines and four of the fourteen "from" address lines identify one of sixteen possible expanders; the remaining 10 "to" address lines and "from" address lines identify a particular line connected to a line card. In the flat cable currently preferred, every other conductor in the cable is grounded to reduce noise and coupling between the signal carrying conductors. At the edges of each cable several lines are used to carry power (e.g., five volts) for terminators (such as terminators 14 of FIG. 1) and for other purposes.

The switching on the buses 10 and 12 is divided into frames and further divided into time slots. (For purposes of discussion and understanding the problems associated with prior art switching systems, reference to specific numbers is helpful.) In the commercially available exchange illustrated in FIG. 1, there are 384 time slots per frame. Each time slot is 216 nsec. long. Consequently, each connection made through the bus is sampled (16 bits) at a rate of 12 kHz. This provides a theoretical bandwidth (Nyquist ratio) of 6 kHz for each connection, however, in practice, to reduce the requirements for filtering, a bandwidth of approximately 3.5 kHz is employed. During each time slot a "to" address, "from" address, and data are transferred. Pipelining is used to allow a continuous flow during each time slot of both addresses and data. For instance, each expander provides a one time slot delay on transferring addresses and data.

In theory, with 384 time slots, up to 192 two-way conversations are possible through the exchange of FIG. 1. Some time slots are used to transfer signalling information from the shelf buses, thus reducing the total possible connections. Because the signalling information changes slowly when compared to the frame rate, relatively infrequent polling of line cards can occur (16 time slots are used for this purpose in the exchange of FIG. 1). Additional time slots are not usable due to "packing" considerations in the connection table. A time slot may be available to send information, but no device may be prepared to send useful information driving that time slot.

It may appear that increased bus capacity can be obtained by simply increasing the number of time slots per frame (i.e., shorten the bus cycles from the described 216 nsec.). The problem in doing this can be appreciated by first examining FIG. 3. Assume that the branch exchange occupies three cabinets shown as CAB 1, CAB 2 and CAB 3. The intershelf bus cable follows a path from shelf to shelf, passing through an ISB paddle board on each shelf. These paddle boards receive the expander cards. The TDM controller is shown located generally midway along the length of the cable. As can be seen, the cable is quite lengthy, and consequently the propagation time of a signal along the cable and the signal's width must be considered. If two signal transmissions are on the bus at the same time, one may interfere with the other. (With the prior art bus the signals do not superimpose linearly on the bus.) Suppose a transmission occurs from one end of the bus for an expander located at the other end of the bus. If a subsequent transmission occurs at this other end of the bus before the first transmission is received, a collision can occur on the bus and data may be lost. This occurs in fact and is referred to as the "nibble effect". (Part of a transmission is "nibbled" away.) The problem typically occurs when transmissions are occurring between extreme ends of the cable during consecutive time slots. To prevent this, the CPU 20 is programmed to bar consecutive transmission between ends of the cable. This limitation hinders the full use of the time slots. If the frequency of transmission over the bus 10 increased, the nibble effect would worsen. For example, special rules would be required not only on transmissions between the ends of the cable, but also from intermediate positions on the cable. Therefore, the traffic over the bus 10 cannot be increased by simply increasing the number of time slots in a frame.

From the above, it can be seen that the bus architecture and partitioning of the exchange of FIG. 1 has limitations on increasing capacity.

(Only the general architecture of the commercial exchange is shown in FIG. 1. Not shown, for instance, are the redundant ISB, CPU, TDM controller and expanders which are frequently used.)

ARCHITECTURE OF IMPROVED COMPUTERIZED BRANCH EXCHANGE

Figure 2:
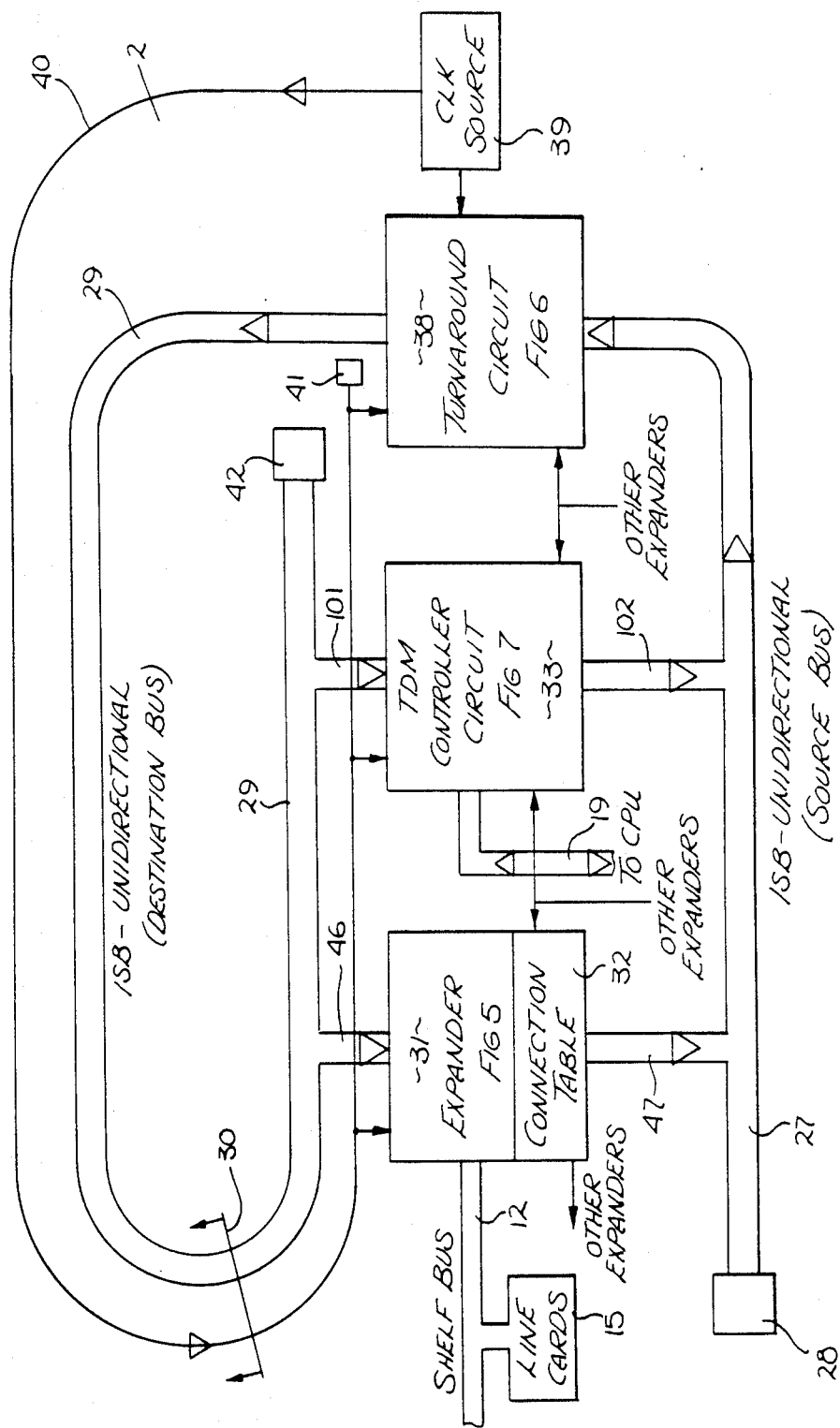
FIG. 2 is a block diagram of a computerized branch exchange illustrating the overall architecture of the present invention.

The exchange of FIG. 2 is partitioned in a similar manner to the exchange of FIG. 1, however, there are substantial differences in the bus structure. As was the case with the exchange of FIG. 1, expanders are used on each of the shelves (such as expander 31) for interconnecting the intershelf bus with the shelf buses. In fact, while the expander 31 is different than the expander 11 of FIG. 1, the shelf bus and line cards used in the embodiment of FIG. 2, are identical to those used for the embodiment of FIG. 1. In FIG. 2, only a single expander 31 is illustrated, however, in the presently preferred embodiment, up to 16 expanders may be employed.

The bidirectional bus 10 of FIG. 1 is divided into two separate unidirectional buses in the present invention. These are shown as the ISB-source bus 27 and the ISB-destination bus 29. In fact, as will be described, the actual cable used for the exchange of FIG. 1, may be used as the source bus and destination bus of FIG. 2.

A TDM controller circuit 33, which corresponds to TDM controller circuit 17 of FIG. 1 is coupled to both the destination bus and source bus. Controller 33 is also coupled to computer bus 19 which may be identical to the bus 19 of FIG. 1. The controller 33 is described in detail in conjunction with FIG. 7.

The source bus is coupled to the destination bus through a turnaround circuit 38. This circuit shall be described in detail in conjunction with FIG. 6. In theory, this circuit is not necessary for a single node exchange such as the one shown in FIG. 2. It provides substantial advantage for internode links as will be discussed in conjunction with FIG. 9. However, the turnaround circuit, even in the single node application, serves several functions. For example, it provides signal delay for signals propagating from bus 27 to 29 which delay can be varied as a function of bus length. Also, the turnaround circuit converts the logic levels on the source bus (7.2 volts/low state, and 8.0 volts/high state) to TTL level signals on the destination bus. Linear current drivers are employed for driving the source bus; these drivers and the bus terminators are shown in FIG. 8.

All signals transmitted from one expander to another expander are transmitted onto the source bus 27, then coupled through the turnaround circuit 38 onto the destination bus 29 and finally into the other expanders. Signals from the TDM controller to the expanders, or from the expanders to the TDM controller 33, follow the same path, that is, they are transmitted onto the bus 27, through the turnaround circuit 38 and onto the bus 29.

A major improvement of the architecture of FIG. 2 results from using a distributed clocking signal in combination with the unidirectional buses. Clocking signals are generated by the clock source 39 and transmitted onto the line 40. (The clock source 39 and turnaround circuit 38 are the same printed circuit board.) The lines 40 have the same length as the bus 29 and in fact conductors within the cable used for the destination bus transmit the signals from clock source 39. With each clocking signal released by the clocked source 39, data is released from the turnaround circuit onto the destination bus 29. Signals propagate along bus 29 at the same rate as the clock signals propagates along the lines 40. When the clock signals reaches the expander 31, the expander is enabled and receives data from the bus 29. The clock pulses on lines 40 and the data on bus 29 propagate from the expander 31 to TDM controller 33 in the same period of time. A circuit only accepts data when it receives a clock pulse. The clock pulses and data signals pass from one unit to the next (in only one direction). The signals never cross one another on the destination bus. (Because there are more than one source of signals on the source bus, signals can cross one another on this bus. The current source drivers prevent this crossing from causing a problem as will be discussed later.) Each unit along the bus 29 (mainly the expanders) always receive data from the bus in the order in which it is placed on the bus by the turnaround circuit. Consequently, several sets of data signals and clock pulses can be propagating along the bus 29 at the same time without interference (the data is pipelined). Put another way, since the clock pulses enabling each of the expanders distributed along the bus 29 move along with the data, and sequentially passes each of the expanders, it is not necessary for a particular set of data and clock pulses, to reach the terminators 41 and 42 before another set of data and clock pulses are transmitted. Two expanders, for instance, spaced apart along the bus 29 can be simultaneously receiving data.

The clock signals on lines 40 also initiate transmissions from the expanders and from the TDM controller onto the source bus. The expander furthest from the turnaround circuit is first activated by the clock signals and the expander closest to the turnaround circuit is last to be activated. As was the case for bus 29, several expanders can be transmitting at the same (real) time.

Terminals 28 absorbs all signals propagating from the expanders in the backward direction. Only the forward-going signals (which move along with the clock) arrive at the turnaround circuit. The linear curent source drives on each expander are not hindered by the presence of reverse travelling signals colliding with the transmitted signal. (Only one transmission from the expanders or TDM circuit occur for each ISB time slot.)

In practice, transmission rates over the source bus and destination bus have been improved by a factor of four when compared to transmissions over bus 10 of FIG. 1. The "time slot" clock signal on lines 40 is transmitted at intervals of 54 nsec. (Lines 40 carry the clocking signals for the time slot and frame.) In fact, the propagation time along bus 29 may be as much as 95 nsec. for the embodiment of FIG. 2 because the return cable which extends from circuit 38 to line 30 lengthens the cable. Therefore, more than one data transmission and clock signal will be present on the bus at a single moment in time (for the current embodiment, up to three may be present). However, for reasons explained above, no interference occurs because the clock signal is distributed along with the data on the bus.

As mentioned, in the presently preferred embodiment, the clock signal from the clock source 39 is both for enabling reception and for causing transmission. A separate clock signal could be distributed to the expanders and TDM controller located along the source bus. This clock signal would pass from unit-to-unit in the same manner that the signal passes along lines 40.

In the prior art exchange of FIG. 1, during each time slot both address information and data is transmitted over bus 10. The address information is obtained from the connection table 18. With the improved architecture of FIG. 2, the connection table is distributed in each of the expanders. For example, the expander 31 has its own connection table 32. Each connection table comprises a 1k×18 RAM (only 384×18 are used) which is loaded from the bus 29. The distribution of the tables among the expanders eliminate the need to transmit the "to" and "from" address from the TDM circuit to the expander during each time slot. As mentioned, these addresses vary slowly (for instance, at the beginning and end of each call) as opposed to the voice data which is sampled and transmitted at a rate of approximately 12 kHz. The buses 27 and 29 of FIG. 2 are primarily data buses, however, these buses are used to program the distributed connection tables.

Figure 10:
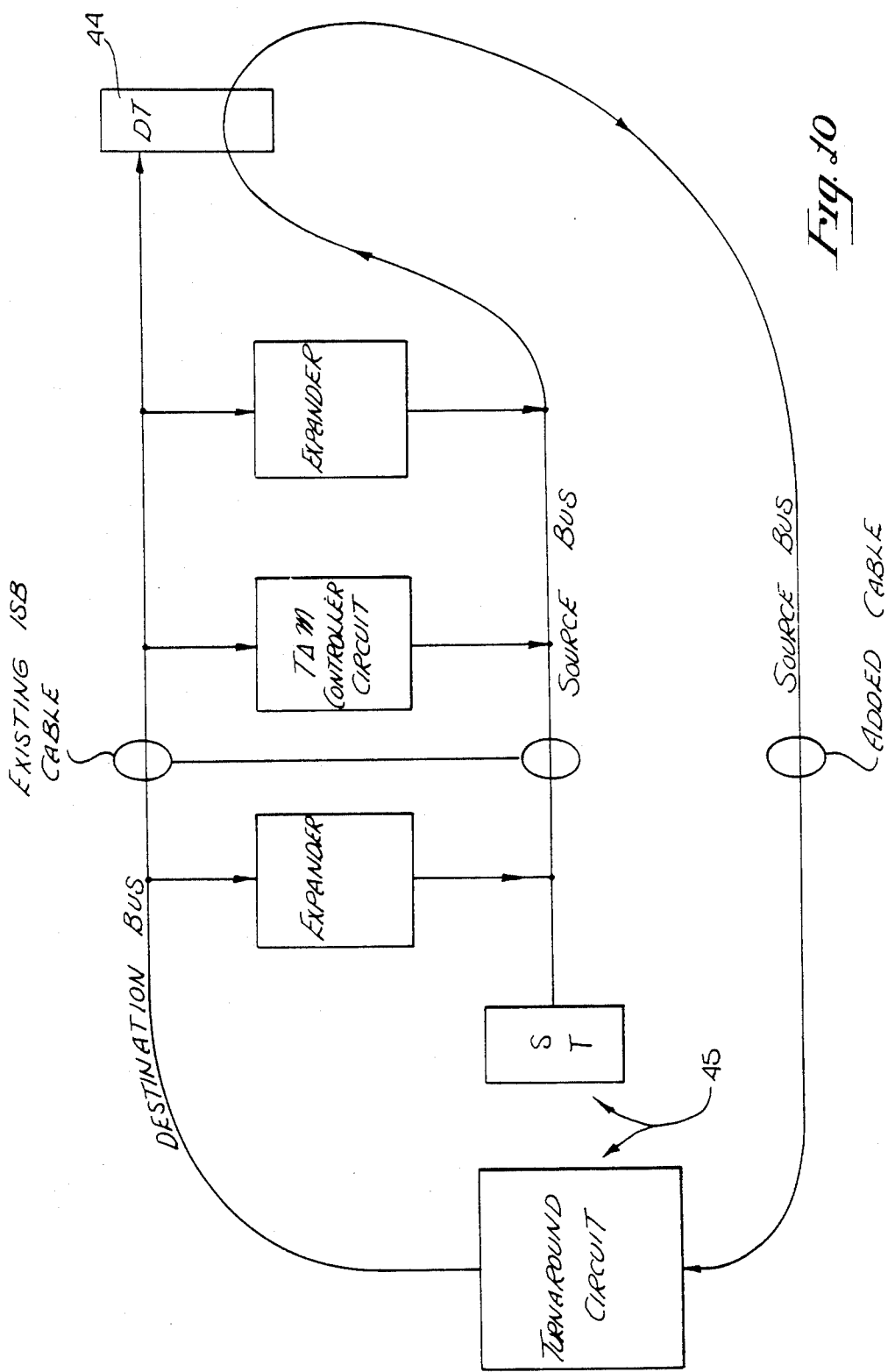
FIG. 10 illustrates in schematic form the intershelf cable of FIG. 3.

Referring again to FIG. 3, as previously discussed, the intershelf bus (ISB) cable is shown routed through the shelves of three cabinets. In the prior art exchange of FIG. 1 the cable generally runs from location 44 downward in the cabinet 3 to location 45 in the upper lefthand corner of cabinet 2. The ISB return cable running directly between locations 44 and 45 is not used in the prior art. (This return cable in the currently preferred embodiment is used in the source bus as shown in FIG. 10, whereas in FIG. 2, the return cable is part of the destination bus.) The present invention may be implemented using the existing cabling in the prior exchange of FIG. 1. In other words, the prior art exchange can be retrofitted to include the improvement of the present invention without changing the main ISB cable. As indicated above, the 28 address lines used with the prior art architecture are not used in the present invention. Consequently, there are a sufficient number of lines in the existing ISB cable to allow that cable to be used both as the source bus and destination bus. Signal flow to and from the source and destination buses occurs over the existing ISB paddle boards. These paddle boards provide the paths 46 and 47 shown in FIG. 2 for expander 31.

Figure 3:
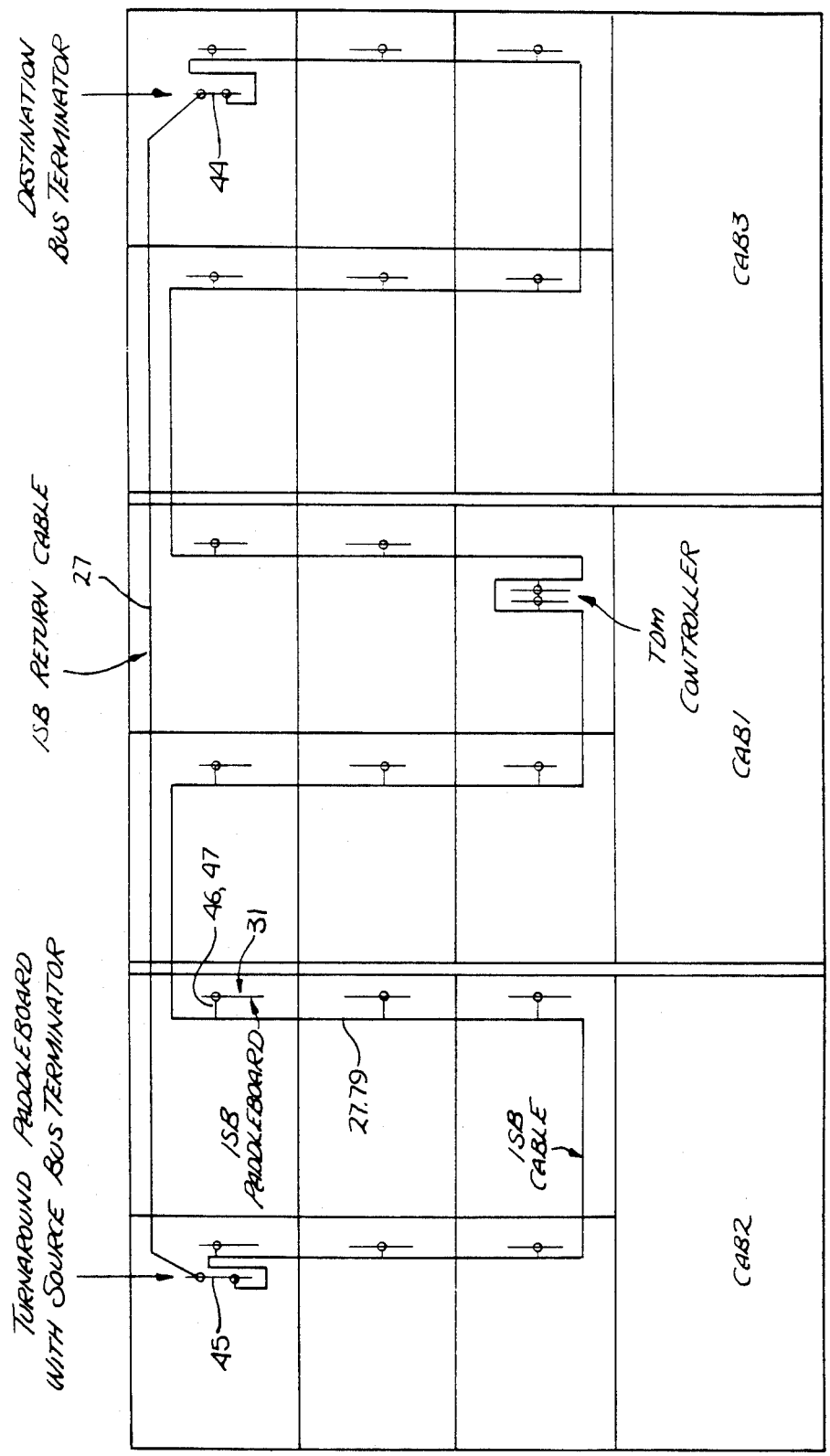
FIG. 3 is a rear elevation view of three cabinets housing a computerized branch exchange. This view is used to illustrate the intershelf bus or cable routing.

Referring to FIG. 10, the ISB cable of FIG. 3 is shown schematically. The turnaround circuit and source bus terminator (ST) are at location 45 of the cabinet; the destination bus terminator (DT) and a pass through for the source cable are at location 44. The newly added (return) cable extends from location 44 to the turnaround circuit. The cabling of the prior art exchange of FIG. 1 used for the destination bus and source bus directly connected to the expanders and TDM controller through the existing paddle boards. In comparing FIGS. 2 and 10, it should be noted that it is the source bus that loops back to the turnaround circuit in FIG. 10, whereas in FIG. 2, the destination bus has the additional loop which causes the expanders and TDM controller to operate in the correct sequence. In FIG. 2, the clock signal drives the source bus in a direction of the turnaround circuit, whereas in FIG. 10 the clock signal which is part of the destination bus drives the data onto the source bus in a direction away from the turnaround circuit. However, the signals are looped back to the turnaround circuit, and hence, arrive at that circuit and onto the destination bus in the proper sequence.

GENERAL OPERATION OF THE EXCHANGE OF FIG. 2

Figure 4:
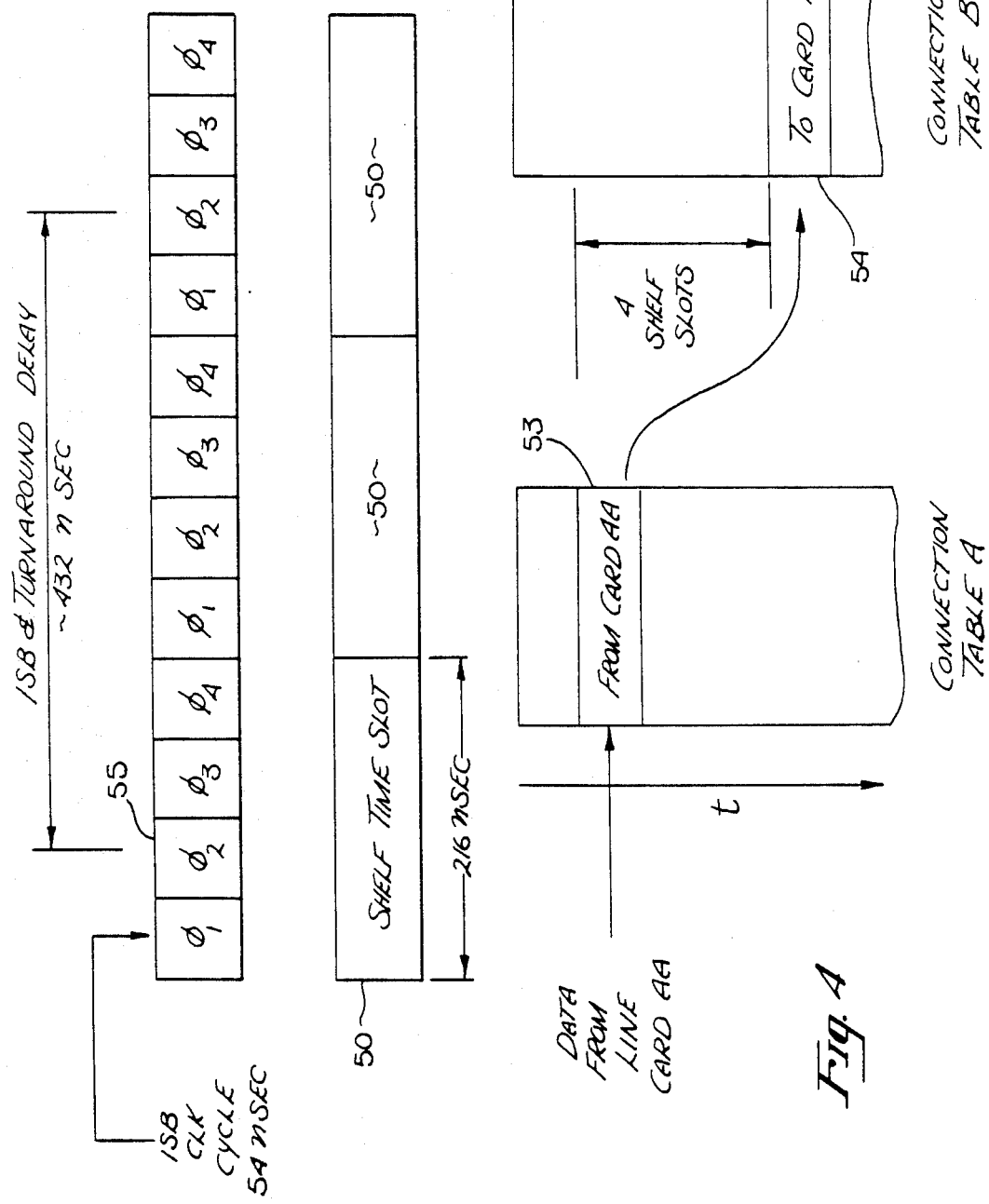
FIG. 4 is a collection of timing diagrams and charts used to describe the intershelf bus timing.

The signal flow over the source and destination buses of FIG. 2 occurs at a rate four times higher than the rate of signal flow over the shelf buses. As mentioned, the shelf bus operation occurs in cycles, or time slots, of 216 nsec. These time slots are shown as slots 50 in FIG. 4. The ISB buses (source and destination) have four cycles, each of 54 nsec. for each shelf time slot. Consequently, four times as much data can be moved between the expanders as can be moved along the shelf bus associated with any particular expander. Four times as many connections, or calls, can be handled by the exchange. Obviously, this is not the case if heavy traffic is confined to a single shelf bus.

As was the case for the exchange of FIG. 1, each frame includes 384 shelf time slots. Sixteen of these time slots are used by the TDM controller 33 of FIG. 2 to perform functions such as loading the connection tables; most of the remaining time slots are used to complete connections (e.g., calls) between expanders (some time slots are not used). The connection tables each have storage for 384 shelf-addresses.

At the beginning of each frame in the current embodiment, a frame clock signal is broadcasted from the clock source 39 through one of the lines 40 along the destination bus. The first 16 shelf time slots are used by the TDM controller. (The number of time slots used by the TDM controller need not be 16, that is, fewer or more may be dedicated for use by the controller. Also, these time slots can occur at any point in the frame, they need not occur at the beginning of the frame.) The controller transmits a signal referred to in this application as the immediate field signal (IMF) at the beginning of each frame. (This signal is transmitted over a line not shown in FIG. 2.) During $\phi 1$ of the ISB clock cycle (see FIG. 4), the TDM controller broadcasts through the buses 22 and 28, a signal which identifies for the expander circuits and turnaround circuit which command is to be executed. For instance, during $\phi 1$, the TDM controller could indicate that a connection table is to be loaded, and identify its shelf, line cards are to be polled, data is to be read to verify the contents of a table, or that the turnaround circuit is to be configured. During $\phi 2$ and $\phi 3$, (if loading of a table is to occur) the TDM controller identifies the location in the table to be accessed (which corresponds to a particular shelf time slot), and supplies the entry (shelf address, read/write command and phase of the bus clock to be used) for the connection table. On $\phi 4$ of the ISB clock cycle, data is read back to the TDM circuit. The four phases of ISB clock are used in a similar manner for polling, etc., and to configure the turnaround circuit as will be described. It is during these sixteen time slots that the distributed "to" and "from" addresses stored in the connection tables are placed within the appropriate expanders.

Assume that a call is placed from a line connected to card AA of expander A. The address of this line is written into location 53 of the connection table, shown in FIG. 4. (The CPU through the TDM controller detects an off hook condition, selects a location in table A and writes into that location.) Assume further that the line called is within line card BB of expander B. The address of the called line of card BB is written into location 54 of the connection table of expander B. (Once again, this is done by the TDM controller.) Each entry in a connection table is 18 bits, ten are for the shelf address and 5 are decoded to provide up to 32 slot enable signals. One bit is used for read/write command and the last two bits identify the phase ($\phi 1$ to $\phi 4$) which is to be used for communications over the ISBs.

The locations 53 and 54 are separated in time by four shelf time slots. During each frame, each expander scans its connection table under control of the clock signals on lines 40. A time slot counter, incremented by the clock signals, forms an address to access the connection table. A new address for the connection table occurs for each shelf time slot. First, the expander A addresses card AA and reads the data from the card. This requires two shelf time slots. (In practice, because of the pipelining that is used, addressing, accessing, etc., occurs simultaneously.) Then the data is placed onto the source bus, for example, during $\phi 2$ of one of the ISB cycles shown as cycle 55. The expanders are able to use any one of the four ISB cycles ($\phi 1$ through $\phi 4$) for transmitting data over the ISB. Transmission from the source bus through the turnaround circuit onto the destination bus takes approximately 432 nsec. in the currently preferred embodiment. Four shelf time slots after data was sought from card AA, location 54 in connection table B is addressed and expander B accepts the data from the destination bus and couples it to the appropriate line on card BB. While not illustrated, entries are made in tables A and B to allow data to flow from card BB to card AA so that a two-way conversation can be completed. Consequently, the data is transferred between the two lines, once per frame.

In the presently preferred embodiment, it is always assumed that the total ISB and turnaround delay will be 432 nsec. If a particular exchange only has a single cabinet, less cabling is involved, and hence, the propagation time through the cable will be shorter. Upon initialization of the exchange, the TDM controller, as one of its commands, may set the delay in the turnaround circuit to some fixed delay as a function of the number of cabinets in the exchange. If, for example, there is only a single cabinet, the delay in the turnaround circuit is greater so that the total delay remains constant, alternatively, the turnaround circuit can measure the delay, and from this measurement set the delay in the circuit to obtain a determined total delay.

It should be noted that the source bus and destination bus form a spiral. An inherent characteristic of this spiral configuration is that the propagation time from any unit's output to its input is a constant. The expanders transmit and receive data at a constant rate which is synchronized by the distributed timing signal. However, the transmission and receiving cycles for each expander are out of phase with one another because the clock pulse is distributed along the cable as discussed.

In the presently preferred embodiment, a single CPU is used along with a single TDM controller. As mentioned, 16 time slots of the 384 shelf time slots are used by this single TDM controller. An additional TDM controller, controlled by a second CPU may be used with the bus apparatus described in this application. Time slots would be assigned to the second TDM controller to allow it access to the buses for completing calls, etc. Multiple computers would be used where a single computer cannot provide sufficient control.

EXPANDER CIRCUIT

A typical expander circuit such as the expander circuit 31 of FIG. 2 is illustrated in FIG. 5. The connections from the expander circuit to the destination bus and source bus are shown on the lefthand side of the figure. The connections to the shelf bus are shown on the righthand side of the figure.

The expander circuit receives the two timing signals from the lines 40, the ISB clock on line 40a, and the frame clock on line 40b, both of which are coupled to a time slot counter 63. Three lines designated as redundancy BS0 through BS2 are received on lines 58. In some exchanges there are redundant buses. The signals on lines 58 are polled to determine which buses are active. The immediate field (IMF) signal previously discussed is coupled on line 59 to the command decoder 67. The destination bus is connected to the expander through lines 46. Lines 46 are coupled through data receivers 82 into a data in latch 68. These receivers and latch are shown in detail in FIG. 8. Parity bits are received on lines 60. (These bits are transmitted on buses 27 and 29.) Outgoing data is coupled through the data outlatch 69 through transmitters 83 and lines 47 to the source bus 27. The latch 69 and transmitter 83 are also shown in detail in FIG. 8. Transmitted parity bits are coupled through line 61. The lines 46, 47, 58, 59, 60 and 61 are all coupled to the destination bus or source bus through the paddle board such as shown in FIG. 3.

When the IMF signal is present on line 59, signals from the data in latch 68 are coupled to the shelf decoder 65. A jumper pack 66 is programmed for each of the expanders so that each expander recognizes a unique address. When the expander is addressed, the command decoder 67 decodes the command received from the data in latch 68 and activates the appropriate control lines to control the expander during the IMF period. The signals from the command decoder 67 determine whether data is to be written into the connection table 72, read back on lines 47 for verification, parity errors exist, or a transmission from input to output ports should take place to check paths in the expander circuit. (Note various timing signals are not shown in order not to overly complicate FIG. 5.)

If the connection table is to be programmed, the appropriate time slot (connection table location) is selected through the buffers 70 and multiplexer 64 and then data is transmitted through the buffers 70 into the input/output data lines of the connection table 72. When data is verified, it is again addressed from the latch 64, transmitted through the buffers 71 and out through the data out latch 69 onto lines 47.

Parity on all incoming data is checked through the parity check/error circuit 80 and an error status is transmitted onto line 61. For outgoing data, the parity generation means 81 examines the data and prepares the appropriate parity bits for line 61.

During the period of time that data is being transmitted on the buses 27 and 29, the count from counter 63 addresses the connection table 72. The data out from the connection table which corresponds to a shelf addressing and read/write command is coupled into the shelf address latch 73. From there the address is coupled to the slot decoder 74 and the addresses coupled into the address buffer 75. The decoder 74 enables one of thirty lines; 10 bits of address from the connection table (through buffer 75) allow the selection of a particular line on the card.

Data to and from the shelf is coupled over the bidirectional bus 77. Incoming data is coupled through the latch 76 while outgoing data is coupled through latch 78 onto the bus 47.

In operation data is latched into latch 68 on every ISB clock signal. Even if the data is not intended for a particular expander it is still latched. This is necessary since there is not sufficient time to determine if the data is for particular expanders and then latched. Data is pipelined through the expander. The decoder 65 (because of patch 66) only permits decoding of commands if they are to be executed (during the IMF period). If data received by an expander (during the non-IMF period) is not for that expander, there will not be a self address in table 72 for that time slot. This prevents the data drom being read into (or read from) a line card. Because of the pipelining on each ISB clock, one expander will couple data to a line card while another expander reads data which will be used by an expander 4 shelf time slots later.

TURNAROUND CIRCUIT

Figure 9:
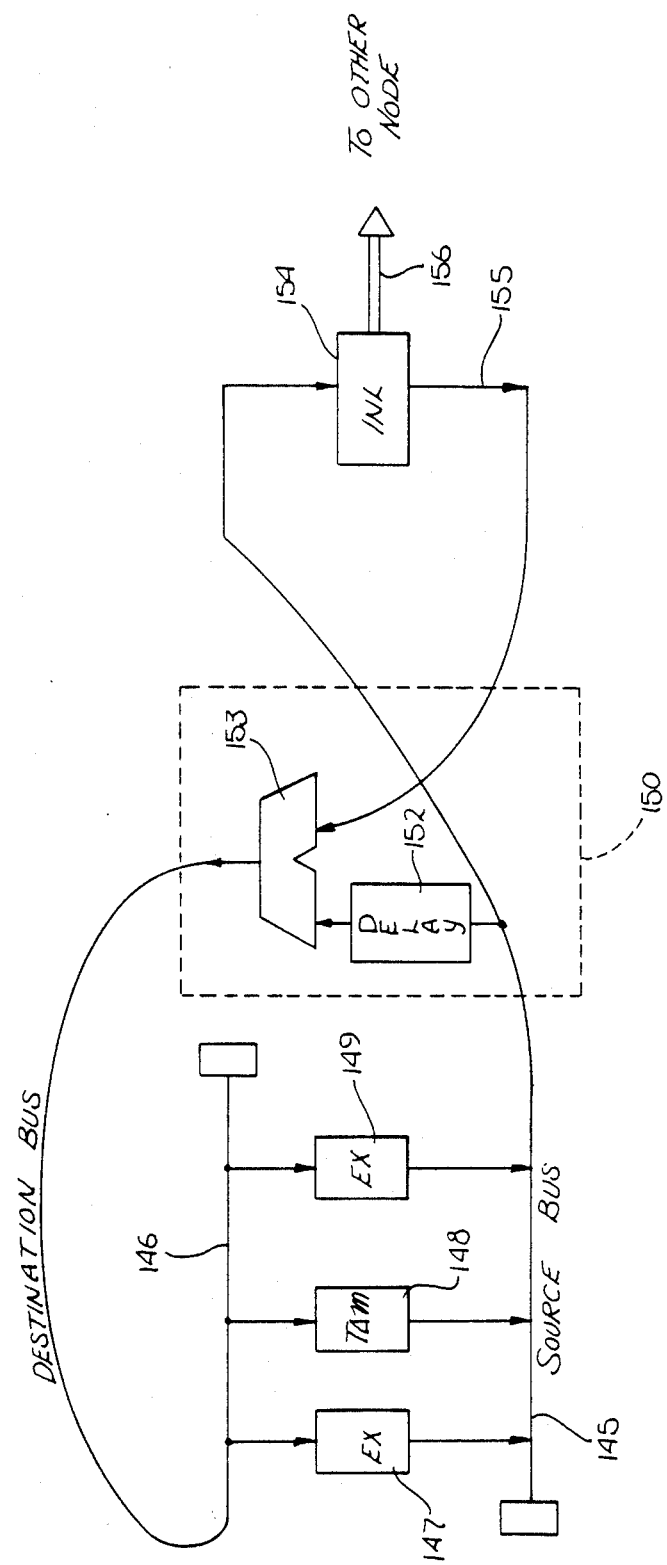
FIG. 9 is a block diagram illustrating the coupling employed through the turnaround circuit when a plurality of computerized branch exchanges are linked.

The turnaround circuit 38 of FIG. 2 is shown in FIG. 6. The particular turnaround circuit illustrated is for a "stand alone" computerized branch exchange, that is, a branch exchange which is not linked to another exchange. The stand alone exchange, however, may have a plurality of cabinets, and as will be described, the delay through the turnaround circuit, is varied as a function of the number of cabinets. In FIG. 9, an alternate version of the turnaround circuit is illustrated where the turnaround circuit provides linking to other exchanges.

The circuit of FIG. 6 receives the source bus 27 through source bus receivers 85. The data from the turnaround circuit is transmitted onto the destination bus 29 through the data drivers 91. Receivers 85 and drivers 91 are shown in FIG. 8. The clock receiver and detector 94 receives the ISB clock signals and the frame clock signals from the end of the line 40. (This is shown as lines 400a and 400b in order to distinguish it from the driving end of the line.) The clock receiver 94 is shown in FIG. 8 as is the clock driver 98. The signals on the source bus (16 data, one parity, and the IMF signal) are coupled through latches 86, 87, 88, then through the multiplexer 89 and latch 90, and onto the destination bus through the drivers 91. When the IMF signal is present, the data is decoded by the command decoder 95 and appropriate control signals are coupled to configuration latch 96 and the multiplexer 89. The command decoder 95 recognizes commands to: load the configuration latch 96 from the data at the output of latch 86, and read the configuration stored within the latch 96 onto the destination bus through the multiplexer 89 (for verification). On initialization of the exchange, the TDM controller circuit loads configuration data into the latch 96 which represents the number of cabinets in the exchange (one, two or three cabinets). This configuration data controls the rate at which data is clocked through latches 86, 87 and 88. As previously indicated with three cabinets present, the data is clocked through more quickly than if a single cabinet is present. This is done to maintain a constant overall delay. The clocking signal on line 99 determines the rate at which the data is transferred through the three latches. Clocking signals from generator 97 (not shown) control the rate of transfer through the latches 86, 87 and 88.

When the IMF signal is not present, the multiplexer 89 directs the data from latch 88 into latch 90, and then onto the ISB cable 29.

The clocking signals on lines 40 are generated in a clock generator 97. The clock generator receives an external clock input and drives the lines 40 through a clock driver 98.

TDM CONTROLLER CIRCUIT

The TDM controller 33 of FIG. 2 is shown in FIG. 7 with its coupling through the destination bus over lines 101 and to the source bus over lines 102. Lines 101 and the clock signals (lines 40) are coupled to the receivers 116; these receivers are shown in FIG. 8. Transmission to lines 102 onto the source bus occurs through the transmitters 123 which are also shown in FIG. 8. Data from the computer bus 19 is coupled onto the TDM controller circuit intermediate bus 112 through bidirectional ports 106 and for diagnostics through port 107. A microprocessor 109 (Part No. 8×305) is used to control the flow of data over the bus 112. A program for the processor 109 is stored in a read-only memory 110. A random-access memory 111 is also coupled to bus 112 and is controlled by the processor 109.

There are several bus paths in FIG. 7 which are used for diagnostic routines; these are not necessary for the present invention, but nonetheless have been shown. The main path of data flow from the computer is through the bidirectional port 106 across bus 112, into the holding latch 115, then to the output buffer 122, and finally to the source bus through the transmitters 123. Data from the destination bus flows from the receivers 116, into the input buffer 118, through the data-in gate 120, and finally onto the bus 112. The data-out gate 121 permits data from the computer bus to be read through the latch 115, through the buffer 122 and back onto bus 112 through gate 121. This loop is used to verify the operation of portions of the TDM controller. The TDM I/O control means 117 receives the clock and frame signals and provides control signals for controlling the flow of data through the latches and gates of FIG. 7. Parity is checked and parity bits are generated by the parity generation and checking means 119.

The control circuit 124 receives signals from the computer associated with the bus 19, decodes the signals and latches them. It also transmits status information back to the computer on request. Among the signals provided by the control circuit 124 are the bus select signals. BS0-2, previously mentioned (used in conjunction with redundant buses). System initialization signals are also provided by control circuit 124. Control circuit 124 also permits direct memory access (DMA) between the computer and the output buffer 122. This path comprises the bus 112 and the holding latch 115.

ISB BUS DRIVERS AND RECEIVERS

For proper operation of the computerized branch exchange of the present invention, care must be taken in the transmission and reception of signals on the buses 27 and 29. The source bus 27 presents a particular problem. Only the turnaround circuit transmits signals onto the destination bus; this bus is driven with TTL logic levels.

Referring briefly to FIG. 2, an expander close to the turnaround circuit 38 may transmit on one ISB time slot followed by the transmission of a signal from an expander further away from the turnaround circuit such as expander 31 on the next ISB time slot. Each time a transmission occurs on the source bus, the signal propagates in both directions. (Source bus is unidirectional in that valid data is transmitted in only one direction.) The first transmitted signal moving toward the terminator 28 (the reverse-moving wave) may in fact be at the expander 31 when the expander 31 must transmit. Thus, a transmission from the expander 31 could be lost because of the "nibble" effect discussed above. This is prevented, however, in the present invention by using current source drivers for the transmission of data onto the source bus. These drivers, in effect, add to the signal on the bus at the time they transmit. This assures a transmission which can be sensed even if the transmission occurs directly on a reverse-moving signal propagating along the bus. These current drivers draw 18 milliamps from the bus for transmitting a low signal, and 0 milliamps for a high signal. This current is added to whatever current is on the bus. This corresponds to voltage levels of 7.2 volts for the low state, and 8.0 volts for the high state at, for instance, the turnaround circuit. Note that if ordinary TTL logic were used for driving the source bus, data would be lost because the TTL logic does not superimpose its signal linearly on top of other signals already present. At the turnaround circuit 33, the data arrives from the various expanders along the source bus in the order transmitted because of the distributed clocking pulse discussed above. Since only the turnaround circuit transmits onto the destination bus, TTL drivers may be used.

Each of the expanders and the TDM controller employ the transmitter shown within dotted line 83 of FIG. 8a. The transmitter is used to drive each of the data lines of the source bus. (A typical transmitter 83 is shown as part of expander of FIG. 5.) The expander and TDM controller provide output TTL levels on the line 129 which are converted to the current source drives. This line is coupled to the base terminal of a transistor 131. The transistors 131 and 132 provide the high level and low level current signals for the source bus. The base of transistor 132 receives a reference signal generated through transistor 134. A transmit enable signal is coupled from circuit 133 to the emitter of transistor 134. Circuit 133 is enabled by the block signal from lines 40. The terminator 28 of FIG. 1 is an 86 ohm resistor coupled to eight volts. The other ends of the lines of the souce bus (at the turnaround circuit) are coupled to +8 volts through a 110 ohm resistor.

Figure 8B:
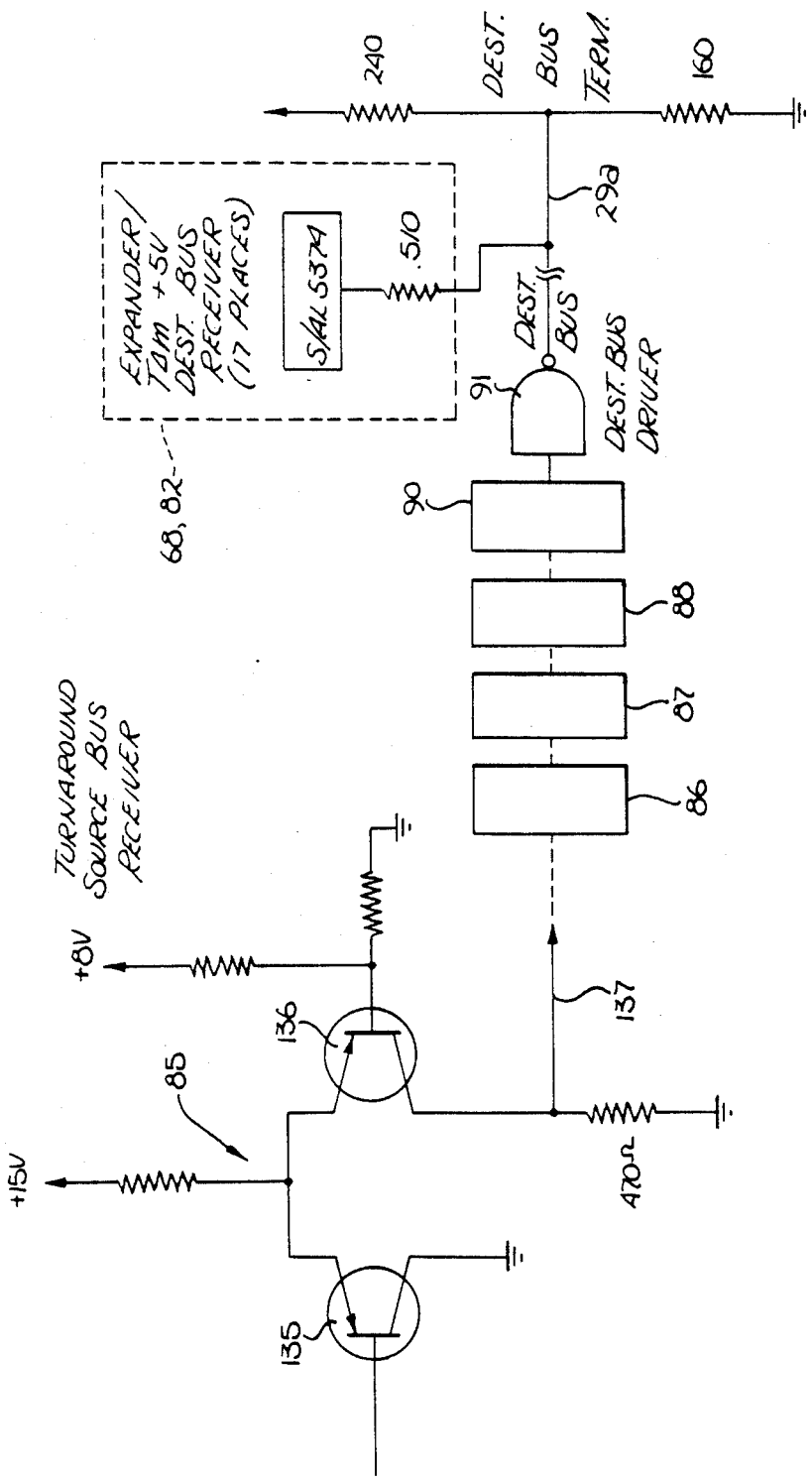

The receiver of the source bus signals (receiver 85 of the turnaround circuit) receives the input signal on the base terminal of transistor 135 and this signal is converted to a TTL level through transistors 135 and 136 (FIG. 8b). The TTL level signal on line 137 is, for instance, coupled into the latches 86, 87, 88 and 90 shown in FIG. 6.

The destination bus driver 91 of FIG. 6 is shown again in FIG. 8 and is a commercially available TTL part (Part No. 74-128 or 74-AS804). Each of the expanders and the TDM circuit sense (receive) the destination bus signals through a 510 ohm resistor in a commercially available component shown within the dotted lines 68, 82. The termination resistors for the destination bus are also shown at the end of line 29a.

In the lower part of FIG. 8, clock driver 98 of FIG. 6 is shown as a commercially available TTL part. The expanders and the TDM controller receive the clock signal with the circuit shown within dotted line 138. This circuit provides a TTL level clock signal on lines 40 which is used to control both the reception of data and the transmission of data as previously discussed. The turnaround clock receiver 94 of FIG. 6 is shown in detail within the dotted line 94 of FIG. 8. The output of this circuit is used by the command decoder and latch 86 in data through latch 86 of FIG. 6. The terminator 41 of FIG. 2 is shown in FIG. 8 as a 470 ohm resistor coupled to a five volt potential.

LINKS TO OTHER NODES THROUGH THE TURNAROUND CIRCUIT

In FIG. 9, the invented computerized branch exchange is shown in abbreviated form as including the source bus 145, destination 146, expander circuits 147 and 149 and a TDM circuit 148. The turnaround circuit is shown within dotted line 150. This turnaround circuit performs the same function and may include the same circuitry as that shown in FIG. 6. The delay provided by the latches of FIG. 6 is shown within block 152. The turnaround circuit of FIG. 9 includes an additional multiplexer 153. This multiplexer is able to select data either from the source bus 145 (through delay 152) or from line 155. The source bus, in addition to being coupled to delay 152, is coupled to the internode link circuit 154. This circuit provides communications to other nodes over lines 156.

The multiplexer 153 allows a connection to a line of a remotely located CBX without requiring additional time slots to be used. When an expander circuit is transmitting signals onto the source bus which are to be received by the remote exchange, these signals are diverted from the destination bus 146 into the remotely located exchange through INL 154. At the same time that this diversion is occuring, the data to be received by the exchanger circuit which transmitted data, is coupled to line 155 and then through the multiplexer 153 onto the destination bus 146. This permits the transmission and reception of data without the use of an additional time slot.

Thus, an improved computerized branch exchange has been described which employs two unidirectional time division multiplexed buses. Additionally, the present invention allows use of existing cabling by redefining the signals on the prior art bus and by using new circuitry in conjunction with the bus.

We claim:

1. A computerized branch exchange comprising:
   a first unidirectional bus;
   a second unidirectional bus;
   a turnaround circuit means for coupling said first bus to said second bus;
   a plurality of interface means each comprising:
   a plurality of interface means coupled to communication lines for transmitting and receiving parallel data;
   expander means coupled to said first and second buses;
   a third bus coupled to said interface means and said expander means;
   said expander means for providing coupling between said third bus and said first and second buses, said expander means coupled to transmit signals onto said first bus and coupled to receive signals from said second bus;
   said expander means further including a memory to store a connection table to provide addresses of selected communication lines;
   a computer for controlling said branch exchange;
   a time division multiplexed (TDM) controller for controlling communications on said first and second buses, said controller coupled to said computer to transmit signals onto said first bus and receive signals from said second bus;
   whereby an improved branch exchange is realized.

2. The computerized branch exchange defined by claim 1 wherein each of said expander means includes current source drivers used for coupling signals from said expander means onto said first bus, said current source drivers inhibiting interference caused by multiple signals being simultaneously present on said first bus.

3. The computerized branch exchange defined by claims 1 or 2 wherein said first and second bus have a constant propagation time for the propagation of a signal between any one of said expander means.

4. The computerized branch exchange defined by claim 3 wherein said turnaround means provides a predetermined delay for signals received from said first bus and coupled to said second bus.

5. The computerized branch exchange defined by claim 4 wherein said delay provided by said turnaround means is a function of said propagation time on said first and second buses.

6. The computerized branch exchange defined by claim 1 wherein said connection tables are programmed by said computer through said controller.

7. The computerized branch exchange defined by claim 6 wherein said first and second buses have a plurality of bus cycles for each bus cycle which occurs on said third buses.

8. The computerized branch exchange defined by claim 1 including clock signal distribution means for distributing a clocking signal at least to said expander means such that said expander means transmit signals onto said first bus and receives signals from said second bus, sequentially, without said signals on said first and second buses interfering with one another.

9. An improved bus apparatus for use with a time division multiplexing system where a plurality of first circuits communicate by time division multiplexing of signals over the bus apparatus comprising:
   a first parallel bus for receiving signals from said first circuits, said first bus coupled to said first circuits;
   a second parallel bus for transmitting signals to said first circuits, said second bus coupled to said first circuits;
   turnaround circuit means for coupling signals from said first bus to said second bus, said turnaround circuit means being coupled to said first and second buses;
   said first and second buses being arranged such that the propagation time between the transmission and reception of a signal by any one of said first circuit means is a constant;
   said first circuits further including a memory for storing a connection table, said connection table providing addresses of selected communication lines to be coupled to said first circuits;
   whereby more information may be transmitted over said bus apparatus without interfering signals occurring.

10. The bus apparatus defined by claim 9 wherein said first and second buses are unidirectional buses.

11. The bus apparatus defined by claim 10 wherein said first circuit means employs current source drivers for coupling signals onto said first bus, said current source drivers inhibiting interference caused by multiple signals being on said first bus simultaneously.

12. The bus apparatus defined by claims 9 or 11 including clock signal distribution means for distributing a clocking signal along said second bus from said turnaround circuit means, said clock signal sequentially enabling each of said first circuits to receive signals from said second bus and to transmit signals onto said first bus.

13. The bus apparatus defined by claim 12 wherein said first and second buses comprise a plurality of parallel paths.

14. The bus apparatus defined by claim 13 wherein said turnaround circuit means provides a delay for said signals coupled from said first bus to said second bus.

15. The bus apparatus defined by claim 14 wherein said delay is adjustable.

16. The bus apparatus defined by claim 15 wherein said turnaround circuit means converts said signals from said first bus from one logic level to a second logic level for a transmission onto said second bus.

* * * * *

UNITED STATES PATENT AND TRADEMARK OFFICE
CERTIFICATE OF CORRECTION

PATENT NO. : 4,627,050
DATED : December 2, 1986
INVENTOR(S) : Johnson et al.

It is certified that error appears in the above-identified patent and that said Letters Patent is hereby corrected as shown below:

| COLUMN | LINE | DESCRIPTION |
|---|---|---|
| 08 | 09 | delete "$\phi 1$" insert $\underline{\phi 1}$ |
| 08 | 13 | delete "$\phi 1$" insert $\underline{\phi 1}$ |
| 08 | 17 | delete "$\phi 2$" insert $\underline{\phi 2}$ |
| 08 | 18 | delete "$\phi 3$" insert $\underline{\phi 3}$ |
| 08 | 23 | delete "$\phi 4$" insert $\underline{\phi 4}$ |
| 08 | 56 | delete "$\phi 2$" insert $\underline{\phi 2}$ |
| 08 | 58 | delete "($\phi 1$ through $\phi 4$)" insert --($\underline{\phi 1}$ through $\underline{\phi 4}$)-- |

Signed and Sealed this

Tenth Day of July, 1990

*Attest:*

HARRY F. MANBECK, JR.

*Attesting Officer*   *Commissioner of Patents and Trademarks*